(12) United States Patent
Behm et al.

(10) Patent No.: US 10,672,234 B2
(45) Date of Patent: Jun. 2, 2020

(54) METHOD AND SYSTEM FOR ENHANCED LOTTERY TICKET ACCOUNTING AND SALES WITH SMART BIN DISPENSERS AT A RETAIL ESTABLISHMENT

(71) Applicant: Scientific Games International, Inc., Newark, DE (US)

(72) Inventors: William F. Behm, Roswell, GA (US); Ajay J. Ghia, Cumming, GA (US); Sten Hallundbaek Mejenborg, Cumming, GA (US); Mark Andrew Thompson, Buford, GA (US)

(73) Assignee: Scientific Games International, Inc., Newark, DE (US)

( * ) Notice: Subject to any disclaimer, the term of this patent is extended or adjusted under 35 U.S.C. 154(b) by 655 days.

(21) Appl. No.: 14/802,526

(22) Filed: Jul. 17, 2015

(65) Prior Publication Data

US 2017/0018148 A1    Jan. 19, 2017

(51) Int. Cl.
*G07F 17/42* (2006.01)
*G06Q 20/20* (2012.01)
(Continued)

(52) U.S. Cl.
CPC ............. *G07F 17/42* (2013.01); *G06Q 20/18* (2013.01); *G06Q 20/20* (2013.01); *G06Q 20/202* (2013.01);
(Continued)

(58) Field of Classification Search
CPC .................................. G07F 17/42; G06Q 20/18
(Continued)

(56) References Cited

U.S. PATENT DOCUMENTS 2,219,650 A    10/1940 Hesel
2,252,720 A    10/1941 Metzner
(Continued)

FOREIGN PATENT DOCUMENTS

CA    2 566 152 A1    5/2003
CA    2 724 047 A1    3/2011
(Continued)

OTHER PUBLICATIONS

PCT Search Report, dated Oct. 11, 2016.
U.S. Appl. No. 15/188,469, filed Jun. 21, 2016.

*Primary Examiner* — Luna Champagne
(74) *Attorney, Agent, or Firm* — Dority & Manning, P.A.

(57) ABSTRACT

A system and associated method are provided for dispensing lottery tickets at retail establishments. A lottery ticket terminal is in communication with a retail POS register and accepts a request for purchase of a particular lottery ticket selected from a plurality of different lottery tickets. A dispenser array is in communication with the terminal and includes a plurality of separate bins having a different respective lottery tickets stored. The lottery tickets have a machine readable code printed thereon and each bin includes a scanner disposed to read the code as the tickets are dispensed from the bin by an electronic drive mechanism. The lottery ticket terminal transmits a purchase signal for dispensing a particular lottery ticket that is routed to the respective bin containing the particular lottery ticket. The bin transmits a signal that is routed to a central lottery server for each lottery ticket dispensed from the bin, the signal identifying the lottery ticket from the scanned code.

12 Claims, 5 Drawing Sheets

(51) Int. Cl.
*G06Q 20/18* (2012.01)
*G06Q 50/34* (2012.01)
*G07F 17/32* (2006.01)

(52) U.S. Cl.
CPC .............. *G06Q 50/34* (2013.01); *G07F 17/32* (2013.01); *G07F 17/3202* (2013.01); *G07F 17/329* (2013.01)

(58) Field of Classification Search
USPC ........................................................ 705/21
See application file for complete search history.

(56) References Cited

U.S. PATENT DOCUMENTS

| | | | |
|---|---|---|---|
| 2,325,054 A | 7/1943 | Helsel | |
| 2,776,007 A | 1/1957 | Dietz et al. | |
| 2,970,784 A | 2/1961 | Kessler | |
| 3,481,520 A | 12/1969 | Pickering | |
| 3,794,228 A | 2/1974 | Colwell et al. | |
| 3,894,669 A | 7/1975 | Wescoat | |
| 4,094,451 A | 6/1978 | Wescoat | |
| 4,202,468 A | 5/1980 | Anderson | |
| 4,284,221 A | 8/1981 | Nagel et al. | |
| 4,397,410 A | 8/1983 | Schueler | |
| 4,515,321 A | 5/1985 | Kahlman | |
| 4,586,639 A | 5/1986 | Ruff et al. | |
| 4,688,708 A | 8/1987 | Irvine et al. | |
| 4,697,726 A | 10/1987 | Gaucher | |
| 4,716,799 A | 1/1988 | Hartmann | |
| 4,730,762 A | 3/1988 | Felix | |
| 4,844,369 A | 7/1989 | Kanayachi | |
| 4,982,337 A * | 1/1991 | Burr | G06Q 50/34 221/7 |
| 5,074,566 A | 12/1991 | Desbiens | |
| 5,113,758 A | 5/1992 | Chou | |
| 5,133,615 A | 7/1992 | Salto et al. | |
| 5,158,293 A | 10/1992 | Mullins | |
| 5,160,076 A | 11/1992 | Ford | |
| 1,905,659 A | 4/1993 | Thomson | |
| 5,215,383 A | 6/1993 | Hilton | |
| 5,216,595 A * | 6/1993 | Protheroe | G07C 15/005 463/17 |
| 5,222,624 A | 6/1993 | Burr | |
| 5,239,165 A | 8/1993 | Novak | |
| 5,256,863 A | 10/1993 | Ferguson et al. | |
| 5,408,417 A | 4/1995 | Wilder | |
| 5,503,318 A | 4/1996 | Chou | |
| 5,569,082 A | 10/1996 | Kaye | |
| 5,709,603 A | 1/1998 | Kaye | |
| 5,833,104 A | 11/1998 | Horniak et al. | |
| 5,836,498 A | 11/1998 | Turek | |
| 5,882,260 A | 3/1999 | Marks et al. | |
| 5,927,583 A | 7/1999 | Kyle | |
| 6,029,851 A | 2/2000 | Jenkins | |
| 6,056,289 A | 5/2000 | Clapper, Jr. | |
| 6,095,624 A | 8/2000 | Wilbert | |
| 6,168,521 B1 | 1/2001 | Luciano et al. | |
| 6,267,670 B1 | 7/2001 | Walker et al. | |
| 6,351,688 B1 * | 2/2002 | Nichols | G06Q 20/202 700/236 |
| 6,405,924 B1 | 6/2002 | Shah | |
| 6,582,304 B2 | 6/2003 | Walker et al. | |
| 6,714,838 B2 | 3/2004 | Scrymgeour et al. | |
| 6,824,464 B2 | 11/2004 | Weil et al. | |
| 6,886,728 B2 | 5/2005 | Roberts et al. | |
| 6,887,153 B2 | 5/2005 | Walker et al. | |
| 6,899,621 B2 | 5/2005 | Behm et al. | |
| 6,899,622 B2 | 5/2005 | Lind et al. | |
| 7,263,411 B2 | 8/2007 | Shows | |
| 7,381,132 B2 | 6/2008 | Roberts | |
| 7,383,099 B2 | 6/2008 | Pollard et al. | |
| 7,665,394 B2 | 2/2010 | Roberts et al. | |
| 7,740,243 B1 | 6/2010 | Kean | |
| 7,756,742 B2 | 7/2010 | Gilmore et al. | |
| 7,850,257 B2 | 12/2010 | Roberts et al. | |
| 8,463,668 B2 | 6/2013 | Youssef et al. | |
| 8,554,365 B2 | 10/2013 | Thomas | |
| 9,251,663 B1 * | 2/2016 | Sandvick | G07F 17/329 |
| 9,339,121 B2 | 5/2016 | Siciliano et al. | |
| 9,760,939 B2 * | 9/2017 | Gleeson | G06Q 30/0635 |
| 2001/0034263 A1 | 10/2001 | Roberts | |
| 2001/0036855 A1 | 11/2001 | Defrees-Parrott et al. | |
| 2002/0162850 A1 | 11/2002 | Yuyama | |
| 2003/0114211 A1 | 6/2003 | White | |
| 2003/0120381 A1 | 6/2003 | Perin, Jr. | |
| 2003/0153381 A1 | 8/2003 | Slattery | |
| 2003/0204288 A1 | 10/2003 | Scrymgeour et al. | |
| 2003/0216164 A1 | 11/2003 | Scrymgeour | |
| 2004/0023711 A1 | 2/2004 | Knapp | |
| 2004/0176154 A1 | 9/2004 | Finnochio | |
| 2004/0193464 A1 | 9/2004 | Szrek et al. | |
| 2004/0227000 A1 | 11/2004 | Behm et al. | |
| 2004/0242309 A1 | 12/2004 | Melesko et al. | |
| 2005/0014552 A1 | 1/2005 | Packes et al. | |
| 2005/0023346 A1 | 2/2005 | Bakker et al. | |
| 2005/0059463 A1 | 3/2005 | Gilmore et al. | |
| 2005/0190533 A1 | 9/2005 | Hultzman et al. | |
| 2005/0233797 A1 * | 10/2005 | Gilmore | G06Q 20/202 463/17 |
| 2005/0250572 A1 | 11/2005 | Kane et al. | |
| 2005/0280210 A1 | 12/2005 | Harrison | |
| 2006/0012116 A1 | 1/2006 | Lovell, Sr. | |
| 2006/0071046 A1 * | 4/2006 | Roberts | G07F 11/68 225/10 |
| 2006/0246992 A1 | 11/2006 | Walker et al. | |
| 2006/0273156 A1 | 12/2006 | Berm et al. | |
| 2008/0208696 A1 | 8/2008 | Olson | |
| 2009/0101714 A1 | 4/2009 | Weyler, III et al. | |
| 2009/0163263 A1 * | 6/2009 | Herndon | G06Q 30/00 463/17 |
| 2009/0163264 A1 | 6/2009 | Whiteman | |
| 2009/0221343 A1 * | 9/2009 | Ekisheva | G07F 17/329 463/17 |
| 2011/0087369 A1 | 4/2011 | Bauer | |
| 2014/0058280 A1 | 2/2014 | Chefles | |
| 2014/0295945 A1 | 10/2014 | Nanni | |
| 2015/0194008 A1 | 7/2015 | Kolios et al. | |
| 2017/0018048 A1 | 1/2017 | Christensen et al. | |
| 2017/0018148 A1 | 1/2017 | Behm et al. | |
| 2017/0169652 A1 | 6/2017 | Kolesov | |

FOREIGN PATENT DOCUMENTS

| | | |
|---|---|---|
| EP | 1574236 A1 | 9/2005 |
| WO | WO 99/26204 A1 | 5/1999 |
| WO | WO 03/043708 A2 | 5/2003 |
| WO | WO 2005/122732 A2 | 12/2005 |
| WO | WO 2006/074156 A2 | 7/2006 |
| WO | WO 2013/075214 A1 | 5/2013 |

* cited by examiner

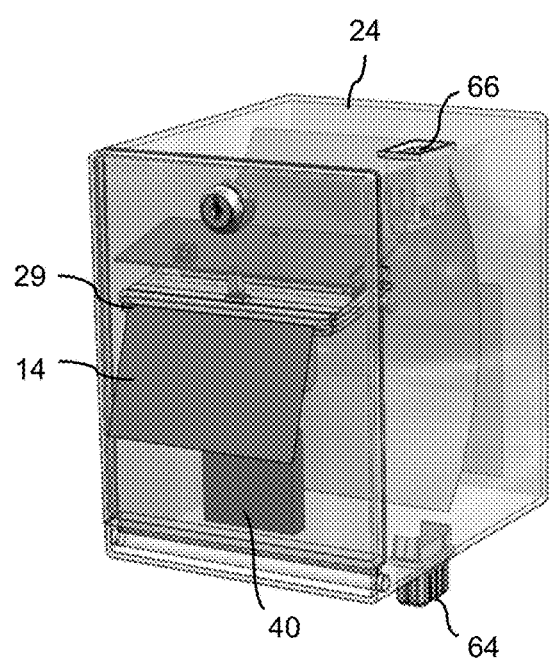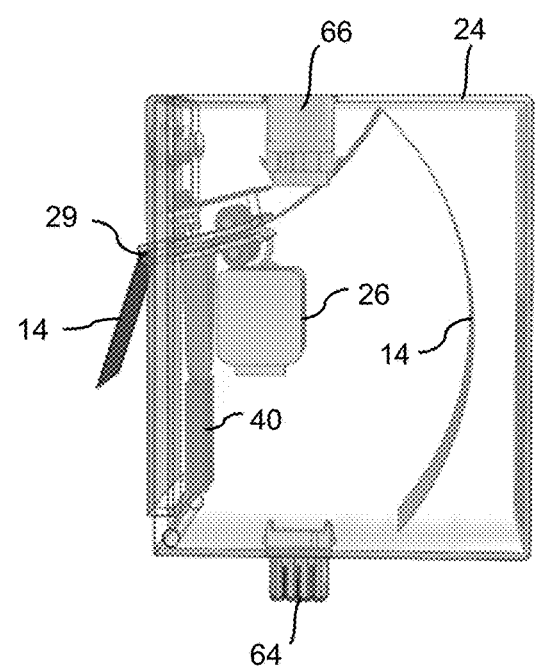
Fig. 6
Fig. 7

METHOD AND SYSTEM FOR ENHANCED LOTTERY TICKET ACCOUNTING AND SALES WITH SMART BIN DISPENSERS AT A RETAIL ESTABLISHMENT

BACKGROUND

Instant lottery tickets are sold at many types of retail locations including, stores, such as grocery stores, general merchandise stores, and the like. Many such stores feature one or more check-out points or lanes equipped with a point-of-sale (POS) register. The lottery tickets, however, are typically sold at a separate lottery point-of-sale terminal within the same retail establishment. This system generally requires additional personnel to staff the lottery ticket POS terminal, or requires the store clerk to divide their time and responsibility between the lottery POS terminal and the store POS terminal. The conventional system and method also require a separate accountability and tracking system for lottery ticket sales, which can add significantly to the cost and burden of providing the lottery to players at the retail establishment.

In addition, because of the current methods by which the tickets are packaged and accounted for, an entire pack (also referred to as a "brick") of tickets is generally activated upon delivery to the retail establishment. This may result in a billing event to the retailer wherein payment becomes due on the entire pack before any significant number of the tickets have actually been sold, which can be a financial burden on the retailer.

Another problematic situation arises with certain current accountability systems and methods wherein the number of lottery tickets sold during a work shift or other defined time period must be accounted for and reconciled with payments received at the POS register or lottery terminal. Often, this is done by hand by store clerks who record start and end serial numbers of the tickets sold during their shift, which can be prone to human error, particularly in a busy or hectic environment. Systems have been proposed that automatically record the serial numbers and calculate the number of tickets sold, but even these systems do not conduct a balance reconciliation with the POS register.

The present invention relates to a unique system and method that addresses at least certain of the issues identified above, and may provide additional benefits over the conventional methodology and systems.

SUMMARY

Objects and advantages of the invention will be set forth in part in the following description, or may be obvious from the description, or may be learned through practice of the invention.

In accordance with aspects of the invention, a system is provided for dispensing instant or other preprinted lottery tickets at a retail establishment. The type of retail establishment may vary widely within the scope and spirit of the invention. For example, in certain embodiments, the retail establishments may be convenience stores, gas stations, pubs, and any other establishment that typically sells lottery tickets to the public. The present system has particular usefulness for much larger retail establishments, such as "big-box" retail stores that are part of a national or other geographic chain, wherein the sale of lottery ticket sales has generally not been implemented.

In certain embodiments, the system includes one or a plurality of retail point-of-sale (POS) registers wherein patrons of the establishment purchase goods. A lottery ticket terminal is configured in communication with the retail POS register to accept a request for purchase of a particular lottery ticket selected from a plurality of different lottery tickets. For example, a patron's request for a particular scratch-off lottery ticket is inputted to the lottery ticket terminal by a retail clerk or other employee of the establishment. A lottery ticket dispenser array is in communication with the lottery ticket terminal and includes one or a plurality of separate dispensing bins having a different respective lottery ticket stored therein. For example, the dispenser array may include ten separate bins, with each bin containing a supply of different scratch-off lottery ticket games, or two or more bins may contain a respective supply of tickets for the same game. Regardless, each lottery ticket contained in the bins includes a machine readable code printed thereon, such as a bar code, QR code, or the like. Each bin in the array includes an electronic drive mechanism that, when activated, dispenses one or more lottery tickets from the bin (depending on the number of tickets requested by the patron). Each bin also includes a scanner disposed to read the code on lottery tickets dispensed from the bin position. In operation of the system, the lottery ticket terminal transmits a purchase signal for dispensing a particular lottery ticket that is routed to the respective bin containing the lottery ticket, which activates the drive mechanism to dispense the requisite number of tickets. As the tickets are dispensed from the bin, the scanner may read the code printed on each ticket, which eventually results in a signal being routed to a central lottery server for each lottery ticket dispensed from the dispenser array. The code printed on each ticket contains identifying information unique to the ticket, and the signal transmitted to the central server enables actions relevant to the sale of the tickets, such as activating the ticket in the lottery provider's system, accounting for tickets sold at a particular retail establishment, reconciling tickets sold at a retail establishment with tickets delivered to the establishment, and for forth. For sequentially dispensed tickets, for example five tickets in a single purchase transaction, the system may be configured to read or otherwise recognize the codes on the first and last ticket if the codes are printed in sequential order on the tickets. By knowing the first and last codes, the intervening codes are readily determined.

For embodiments wherein the retail establishments are part of a chain and are operated under the direction of a central office or organization, the central lottery server may be in communication with a central retail server that is common to such establishments, wherein the lottery sever provides accountability and billing information to the central retail server based on lottery tickets dispensed and activated during defined time periods. For example, the lottery server may provide to the central retail server a detail accounting of the number of tickets sold at each individual retail establishment over a desired time period. The lottery server may also provide accountability information related to the number of tickets sold versus the number of tickets delivered to each respective establishment, including particularly identifying discrepancies between the number of tickets delivered and the number of tickets sold.

In addition, a retail establishment may include a back office server in communication with the retail POS register, wherein the central lottery server provides accountability and billing information to the individual back office servers based on lottery tickets dispensed at the respective retail establishments during defined time periods.

A plurality of the retail establishments may be in communication with the central retail server and the central lottery server, with each of the retail establishments including a retail POS register, lottery ticket terminal, and dispensing bin configured as discussed above. In this configuration, the central lottery server provides accountability and billing information to the central retail server for each of the retail locations based on lottery tickets dispensed at the respective retail locations during defined time periods.

A further enhancement provided by the present system and method is that individual tickets may also be individually activated in the lottery computer system upon receipt of the code indicating that the ticket has been dispensed. Only winning tickets that have been activated in the system can later be redeemed.

The system may, in certain embodiments, be configured such that the lottery ticket terminal transmits a purchase code for the lottery ticket to the retail POS register. In this manner, the patron pays for the lottery tickets at the POS register along with other goods purchased at the establishment.

The system may be configured with a bin controller that controls the various functions of the dispenser array, including receiving and routing the purchase signals from the lottery ticket terminal to the correct bins, and communicating with the central lottery server and/or the retail establishment back officer server.

The present invention also encompasses a system for dispensing lottery tickets at a retail establishment that includes a lottery ticket dispenser array having at least one bin with lottery tickets stored therein, the lottery tickets containing a machine readable code printed thereon. Each bin in the dispenser array includes an electronic drive mechanism that dispenses the lottery tickets therefrom, and a scanner disposed to read the code on the lottery tickets dispensed from the bin. A central lottery server is in direct or indirect (e.g., via a controller) communication with the bin such that a signal generated by the scanner at the bin is routed to the central lottery server for each ticket dispensed from the bin, the signal identifying the lottery ticket from the scanned code. This system may, in addition, include any of the features and configurations discussed above.

Another system within the scope of the invention for dispensing lottery tickets at a retail establishment includes a lottery ticket terminal configured to accept a request for purchase of a lottery ticket. A lottery ticket dispenser array includes at least one bin having lottery tickets stored therein, with each lottery ticket containing a machine readable code printed thereon. Each bin has an electronic drive mechanism that dispenses the lottery tickets therefrom, and a scanner disposed to read the code on the lottery tickets dispensed from the bin. A control module is in communication with the lottery ticket terminal and the bin, wherein, upon receipt of a purchase request from the lottery ticket terminal, the control module transmits a signal to the bin that activates the drive mechanism to dispense the purchased lottery ticket. The control module also receives data from the scanner related to the code printed on the lottery ticket dispensed from the bin. A retail point-of-sale (POS) register maybe in communication with the control module, wherein the control module transmits pricing information for the requested lottery ticket to the POS register. The control module may be contained within the lottery ticket terminal, or separate from the terminal. In addition, lottery ticket dispenser may include a plurality of the bins, with each bin containing different respective lottery tickets, wherein the control module is in communication with each of the bins to transmit the signal for dispensing the requested lottery ticket from the correct one of the bins.

The invention also encompasses various method embodiments for dispensing lottery tickets at a retail establishment. One such method includes inputting a request for a particular lottery ticket from a plurality of different available tickets into a lottery terminal that is in communication with a point-of-sale (POS) register at the retail establishment. A signal is then transmitted to a lottery ticket dispenser array to dispense the requested lottery ticket from one of a plurality of separate bins configured in the dispenser array. The requested ticket(s) is then dispensed from the appropriate bin and a code printed on the lottery ticket is scanned as it is dispensed from the bin. A signal routed from the bin scanner is then transmitted to a central lottery server, the signal identifying the lottery ticket from the scanned code such that each lottery ticket dispensed from the bins is individually identified to the central lottery server, either immediately or in a batch process (e.g., one batch per work shift).

The method may include transmitting a purchase code for the lottery ticket from the lottery terminal to the retail POS register for payment of the lottery ticket at the POS register.

With the method, the signal transmitted to the lottery ticket dispenser may be generated from the retail POS register or the lottery ticket terminal.

As mentioned, an enhancement of the method may include activating the dispensed lottery ticket at the central lottery server upon receipt of the signal identifying the lottery ticket. With this embodiment, accountability and billing information may be provided to the central retail server from the central lottery server based on lottery tickets actually activated during defined time periods (and not just dispensed). Accountability and billing information may also be transmitted from the central lottery server to the back officer server based on lottery tickets activated during defined time periods. A plurality of retail locations may be in communication with the central retail server and the central lottery server, wherein the method further includes providing accountability and billing information to the central retail server from the lottery server for each of the retail locations based on lottery tickets activated at the respective retail locations during defined time periods. As each ticket is dispensed, the central lottery server may change a ticket's activation status in a ticket file to reflect its newly sold status.

BRIEF DESCRIPTION OF THE DRAWINGS

A full and enabling disclosure including the best mode of practicing the appended claims and directed to one of ordinary skill in the art is set forth more particularly in the remainder of the specification. The specification makes reference to the appended figures, in which:

FIG. 6 is a back perspective view of an individual bin of the lottery ticket dispenser of FIG. 4; and FIG. 7 is a side view of the individual bin of the lottery ticket dispenser of FIG. 4.

DETAILED DESCRIPTION

Reference will now be made in detail to various and alternative exemplary embodiments and to the accompanying drawings, with like numerals representing substantially identical structural elements. Each example is provided by way of explanation, and not as a limitation. In fact, it will be apparent to those skilled in the art that modifications and variations can be made without departing from the scope or spirit of the disclosure and claims. For instance, features illustrated or described as part of one embodiment may be used on another embodiment to yield a still further embodiment. Thus, it is intended that the present disclosure includes modifications and variations as come within the scope of the appended claims and their equivalents.

Figure 1A:
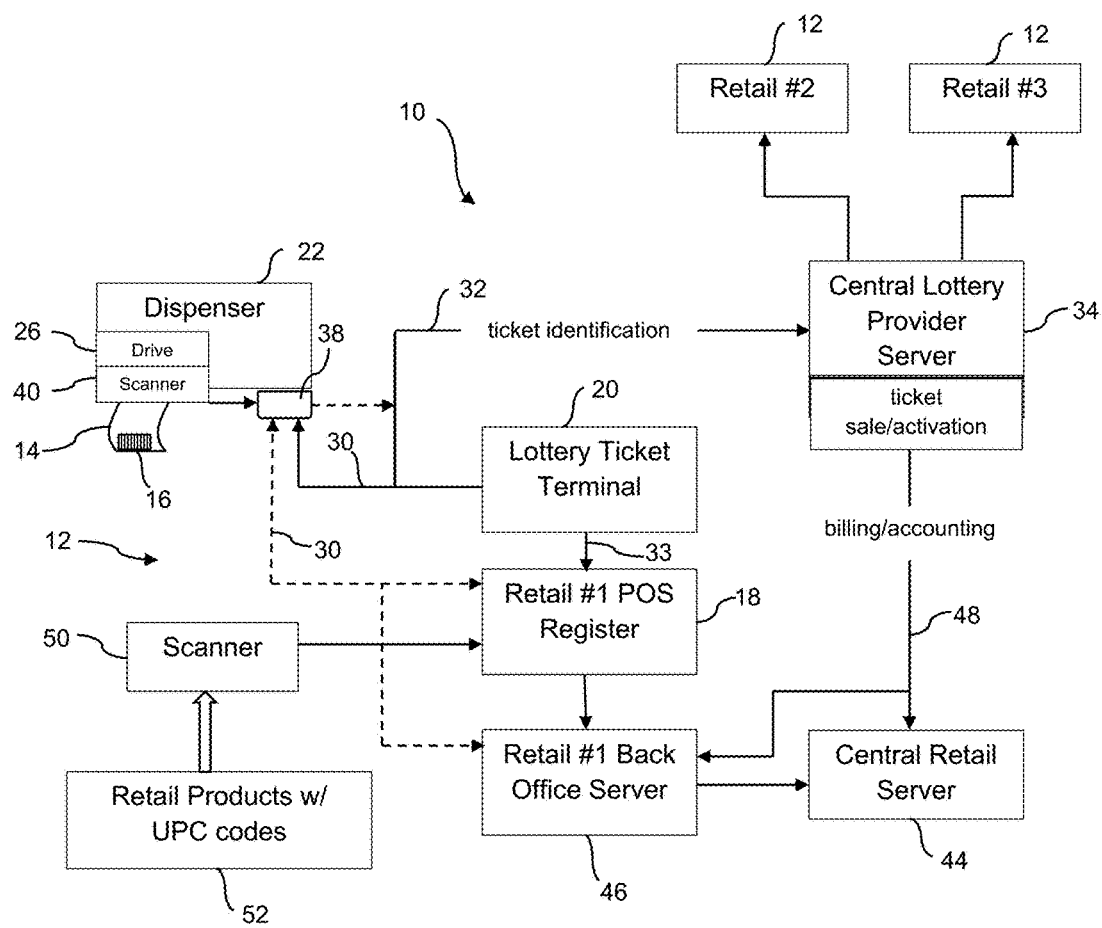
FIG. 1A is a block diagram of a system and associated methodology in accordance with aspects of the present invention.

FIG. 1A depicts an embodiment of a system 10 and related methodology for dispensing lottery tickets 14 at a retail establishment 12. As mentioned above, the type of retail establishment 12 may vary widely within the scope and spirit of the invention. A retail establishment or location 12, such as a retail store, convenience store, pub, restaurant, or the like, is generally authorized by a lottery jurisdiction to carry out lottery activities, such as the sale of instant scratch-off tickets or terminal printed draw tickets for games such as Powerball™. The lottery jurisdiction may be a state lottery authority, such as the Pennsylvania Lottery, or any other governmental jurisdictional authority. A separate game provider may be partnered with the lottery jurisdiction to provide certain control, implementation, and logistical functions of the game. It should be appreciated that the type of retail establishment 12 or lottery jurisdiction entities are not limiting factors of the invention.

Although not limited to such, the present system 10 has particular usefulness for larger retail establishments, such as "big-box" retail stores that are part of a national or other geographic chain. In FIG. 1A, three separate retail establishments 12 are depicted, with details given for one the establishments. This is for illustrative purposes only. It should be appreciated that the invention encompasses a single retail establishment 12, as well as a multitude of establishments 12, as discussed in greater detail below.

The retail establishment 12 includes one or more retail point-of-sale (POS) registers 18 wherein patrons of the establishment 12 purchase goods 52. Typically, a scanner 50 is associated with the POS register 18 to scan a UPC code on the products 52, with the UPC code linked to a purchase price and identification of the products 52, as is well-known in the art.

In the embodiment of FIG. 1A, a lottery ticket terminal 20 is configured in wired or wireless communication with the retail POS register 18 to accept a request for purchase of a particular lottery ticket 14 selected from a plurality of different lottery tickets made available to patrons for purchase. This request may be input directly to the terminal 20 or come via the POS register 18, as discussed below. The lottery tickets 14 may be, for example, conventional instant scratch-off lottery tickets. Various types of lottery ticket terminals are known in the art and suitable for configuration with a system 10 in accordance with the invention. For example, Scientific Games Corporation having a principal place of business in Alpharetta, Ga., USA, offers Flair™ and Wave™ lottery ticket terminals that may be readily configured by those skilled in the art for a system as described herein. A patron's request for a particular scratch-off lottery ticket may be inputted into the lottery ticket terminal 20 by a retail clerk or other employee of the retail establishment 12 by various means. For example, the terminal 20 may be configured with a scanner, wherein the clerk scans a "master" having a code corresponding to the particular lottery ticket 14 requested by the patron. Thus, a master would be provided for each type of lottery ticket 14 offered by the establishment 12. In another embodiment, the terminal 20 may be configured with a touch-screen, keyboard, or other data input device, wherein the clerk enters or identifies the ticket 14 requested by the patron.

Still referring to the embodiment of FIG. 1A, a "smart" lottery ticket dispenser array 22 is in wired or wireless communication with the terminal 20. This dispenser array includes one or a plurality of individual lottery ticket bins 24 (FIG. 2), with each bin 24 typically containing a different respective lottery ticket game. For example, one bin 24 may contain "Lucky 7" themed scratch-off lottery tickets 14, while an adjacent bin 24 may contain "Gold Rush" themed scratch-off lottery tickets 14, and so forth.

Each lottery ticket 16 in the different bins includes a machine readable code 16 printed thereon, such as a bar code, QR code, or the like. The type of code 16 may vary depending on the desired information content of the code 14, space on the ticket 14, and so forth. The use of such codes 16 on lottery tickets 14 for various functions related to inventory, identification, verification, and security are well-known.

Referring to FIGS. 6 and 7, each bin 24 in the dispenser array 22 includes an electronic drive mechanism 26 that, when activated, dispenses one or more lottery tickets 14 from the bin 24 (depending on the number of tickets requested by the patron). This drive mechanism 26 may include a motor that drives a friction roll, wherein the tickets 14 are engaged between the friction roll and an idler roll such that driven rotation of the friction roll causes the tickets 14 to be advanced through a dispensing slot 29 in a wall of the individual bin 24. The drive mechanism 26 may also include a sensor that detects a leading and/or trailing edge of adjacent tickets so as to control the length or the time of the dispense sequence. For example, such a sensor may detect a perforation line between adjacent tickets. Alternately, the friction or idler roll may include an encoder that indirectly measures the length of a ticket passing between the rolls as a function or rotations of the roll. In another embodiment, a timing circuit may control the dispense cycle as a function of run time of the motor. It should be appreciated that the drive mechanism may be variously configured to perform the functions of dispensing the requisite number of tickets 14 from the individual respective bin 24 within the scope and spirit of the invention.

In the illustrated embodiments, each bin 24 also includes a scanner 40 disposed so as to read the code 16 on the lottery tickets 14 as they are dispensed from the bin 24. The scanner 40 may be any conventional barcode reader, such as a point scanner, linear scanner, laser scanner, LED image scanner, and so forth. The tickets 14 are loaded into the bins 24 such that the code 16 printed on each ticket passes within the detection field of the scanner 40. An integral (or separate) reader is configured with the scanner 40 to decode the scanner signal.

In operation of the system 10 depicted in FIG. 1A, the lottery ticket terminal 20 transmits a purchase signal 30 for dispensing a particular lottery ticket 14 that is routed to the respective bin 24 within the dispenser array 22 containing the requested lottery ticket. This purchase signal 30 may be sent to a bin controller 38 associated with the dispenser array 22, with the controller 38 generating a dispense signal that is routed to the proper bin 24 to activate the drive mechanism 26 and dispense the requisite number of lottery tickets 14 from the bin 24. In essence, the bin controller 38 functions as a signal router for the array 22 that ensures that the signal 33 is routed to the correct bin 24.

FIG. 1A depicts an alternate embodiment wherein the purchase signal 30 is generated by the POS register 18 and transmitted to the bin controller 38 after the POS register 18 receives a purchase code 33 from the lottery ticket terminal 20 corresponding to the particular ticket requested by the patron.

As the tickets 14 are dispensed from the bin 24, the scanner 40 reads the code 16 printed on each ticket or, alternatively, the first and last codes printed on sequentially dispensed tickets. A signal 32 corresponding to the scanned code is generated and routed to a central lottery server 34 for each lottery ticket dispensed from the dispenser array 22. In the embodiment of FIG. 1, this signal 32 is generated and transmitted by a controller 35 configured with the lottery ticket terminal 20, which is in wired or wireless communication with the central lottery server 34. The controller 35 may be an integral component of the terminal 20 (or integrated with the controller's other functionalities), or an add-on component that is configured in communication with the lottery terminal 20. As mentioned, the code 16 printed on each ticket contains identifying information unique to the ticket, much akin to a serial number assigned to each ticket, and the signal 32 transmitted to the central server 34 enables actions relevant to the sale/dispensing of the individual tickets 14. For example, the central lottery server 34 may include a database of all tickets delivered to the respective retail establishments 12, and the near instantaneous identification of dispensed/sold lottery tickets 14 to the server 34 enables various desired functionalities. For example, the individual lottery tickets 14 may remain "inactive" in the lottery provider's system (and thus unable to be redeemed) until individually activated by the central lottery server 34 as they are dispensed and sold. Thus, fraudulently obtained tickets (e.g., stolen or otherwise illegally obtained) cannot be redeemed. This is contrary to a conventional practice of activating entire books ("packs") of tickets upon delivery to a retail establishment 12.

The present system 10 and associated method allows for enhanced accountability of lottery tickets 14 sold at a particular retail establishment 12 by logging each ticket as it is sold and dispensed. The number of tickets 14 sold during a work shift (or other time period) is easily determined by generating a report by the central server 34 of the tickets sold at any of the retail establishments during any defined time period. The number of tickets 14 sold at any of the retail establishments 12 can be readily reconciled with tickets delivered to the establishment. Likewise, the number of tickets 14 dispensed during a defined time can be readily and electronically reconciled with reported purchase transactions from the respective establishment 12, with discrepancies being immediately identified for further investigation.

Another particular advantage of the system 10 and associated method is that billing practices between the retail establishments 12 and lottery authority, the lottery service provider or ticket manufacturer can be based on real-time sales of the lottery tickets 14. For example, the retail establishments 12 can be invoiced on a periodic basis (e.g., daily or weekly) for the actual number of tickets sold (dispensed) at each respective establishment based on the signals 32 routed to the central lottery server 34 instead of upon delivery, or other payment methodology typically in use today. These include but are not limited to consignment for a predetermined time period, or estimate of sales based on the number of winning tickets cashed from a pack of tickets being sold.

FIG. 1A depicts the central lottery server 34 that is common to the retail establishments 12. The term "server" is used herein to encompass any configuration of computer hardware and software that is maintained by a lottery authority or game provider to carry out the functionalities of the present system 10 and associated method, as well as any manner of additional lottery functions known to those skilled in the art. It should be readily appreciated that the server 34 may include an integrated server, or any manner of periphery server or other hardware structure. The central lottery server 34 is typically remote from the retail establishments 12, and is in communication with the establishments 12 via a suitable secure communication network, which may include any manner of wide area network, wireless internet, or cloud computing. The server 34 may be a single networked computer, or a series of interconnected computers having access to the communications network via a gateway or other known networking system. Generally, the server 34 is configured to communicate with, manage, execute and control individual lottery terminal units 20 within the lottery jurisdiction. In the embodiment depicted in FIG. 1B, the server 34 is a "front end" server provided by the lottery game provider that is interfaced with the existing draw/instant game system infrastructure one or more separate lottery authorities. The server 34 may include a memory for storing gaming procedures and routines, a microprocessor (MP) for executing the stored programs, a random access memory (RAM) and an input/output (I/O) bus. These devices may be multiplexed together via a common bus, or may each be directly connected via dedicated communications lines, depending on the needs of the system 100.

The server 34 may be directly or indirectly connected through an I/O bus to any manner of peripheral devices such as storage devices, wireless adaptors, printers, and the like. In addition, a database (DB) may be communicatively connected to the server 34 and provide a data repository for the storage and correlation of information gathered from the individual dispenser arrays 22, such as the identity of each lottery ticket 14 dispensed from the array, the time of the dispense sequence, confirmation of ticket activation, and so forth.

It should be appreciated that embodiments of the methods and systems 10 disclosed herein may be executed by one or more suitable networked lottery gaming components and establishment components (e.g., POS register 18, back office server 46) within a plurality of the establishments 12, as well as the remote central server 34. Such gaming systems and computing devices may access one or more computer-readable media that embody computer-readable instructions which, when executed by at least one computer, cause the computer(s) to implement one or more embodiments of the methods of the present subject matter. Additionally or alternatively, the computing device(s) may comprise circuitry that renders the device(s) operative to implement one or more of the methods of the present subject matter. Furthermore, components of the presently-disclosed technology may be implemented using one or more computer-readable media.

As mentioned above, aspects of the present system 10 and methods rely on the transmission of data over one or more communications networks. It should be appreciated that network communications can comprise sending and/or receiving information over one or more networks of various forms. For example, a network can comprise a dial-in, public switched telephone network (PSTN), a local area network (LAN), wide area network (WAN), the Internet, an intranet or other type of network. A network may comprise any number and/or combination of hard-wired, wireless, or other communication links.

Referring again to FIG. 1A, for embodiments wherein the retail establishments 12 are part of a chain and are operated under the direction of a central office or organization, the central lottery server 34 may be in communication with a central retail server 44 (e.g., a "home office") that is common to such establishments 12. The central lottery server 34 may provide ticket accountability and billing information 48 based on real-time sales of the lottery tickets 14 at scheduled times to the central retail server 44 based on lottery tickets 14 dispensed during defined time periods. The dispensed tickets may have also been activated during the same time period and, as used herein "dispensed" includes tickets that are also activated by the central lottery server 34. For example, the central lottery server 34 may provide to the central retail server 44 a detailed accounting of the number of tickets sold at each individual retail establishment 12 during a defined time period. The lottery server 34 may also provide accountability information related to the number of tickets 14 dispensed versus the number of tickets delivered to each respective establishment, including particularly identifying discrepancies between the number of tickets delivered and the number of tickets dispensed. At its end, the central retail server 44 can compare the number of tickets 14 reported as dispensed to the sales transactions at the respective establishment 12 (reported via a back office server 46 associated with each establishment 12 or directly from the POS registers 18) over the same time period Each retail establishment 12 may include a back office server 46 in communication with the retail POS register 18, wherein the central lottery server 34 may provide accountability and billing information directly to the individual back office servers 46 (as indicated in FIG. 1A) based on lottery tickets 14 dispensed at the respective retail establishment 12 during defined time periods.

Still referring to FIG. 1A, a plurality of the retail establishments 12 may be in communication with the central retail server 44 and the central lottery server 34, with each of the retail establishments including a retail POS register 18, lottery ticket terminal 20, and dispenser array 22 configured as discussed above. In this configuration, the central lottery server 34 provides accountability and billing information to the central retail server 44 for each of the retail locations 12 based on lottery tickets 14 dispensed at the respective retail locations 12 during defined time periods.

FIG. 1A reflects that the system 10 may, in certain embodiments, be configured such that the lottery ticket terminal 20 transmits a purchase code 33 for the lottery ticket 14 requested by the patron to the retail POS register 18. In this manner, the patron pays for the lottery tickets 14 at the POS register 18 along with other goods 52 purchased at the establishment 12.

As mentioned above, the system 10 may be configured with a bin controller 38 that is integrated with the dispenser array 22 or remote from the array 22. This bin controller 38 controls the various functions of the dispenser array 22, including receiving and routing the purchase signals 30 from the lottery ticket terminal 20 or POS register 18 to the correct bins 24, and communicating with the central lottery server 34 and/or the retail establishment back officer server 46 directly or via the central lottery server 34.

Figure 1B:
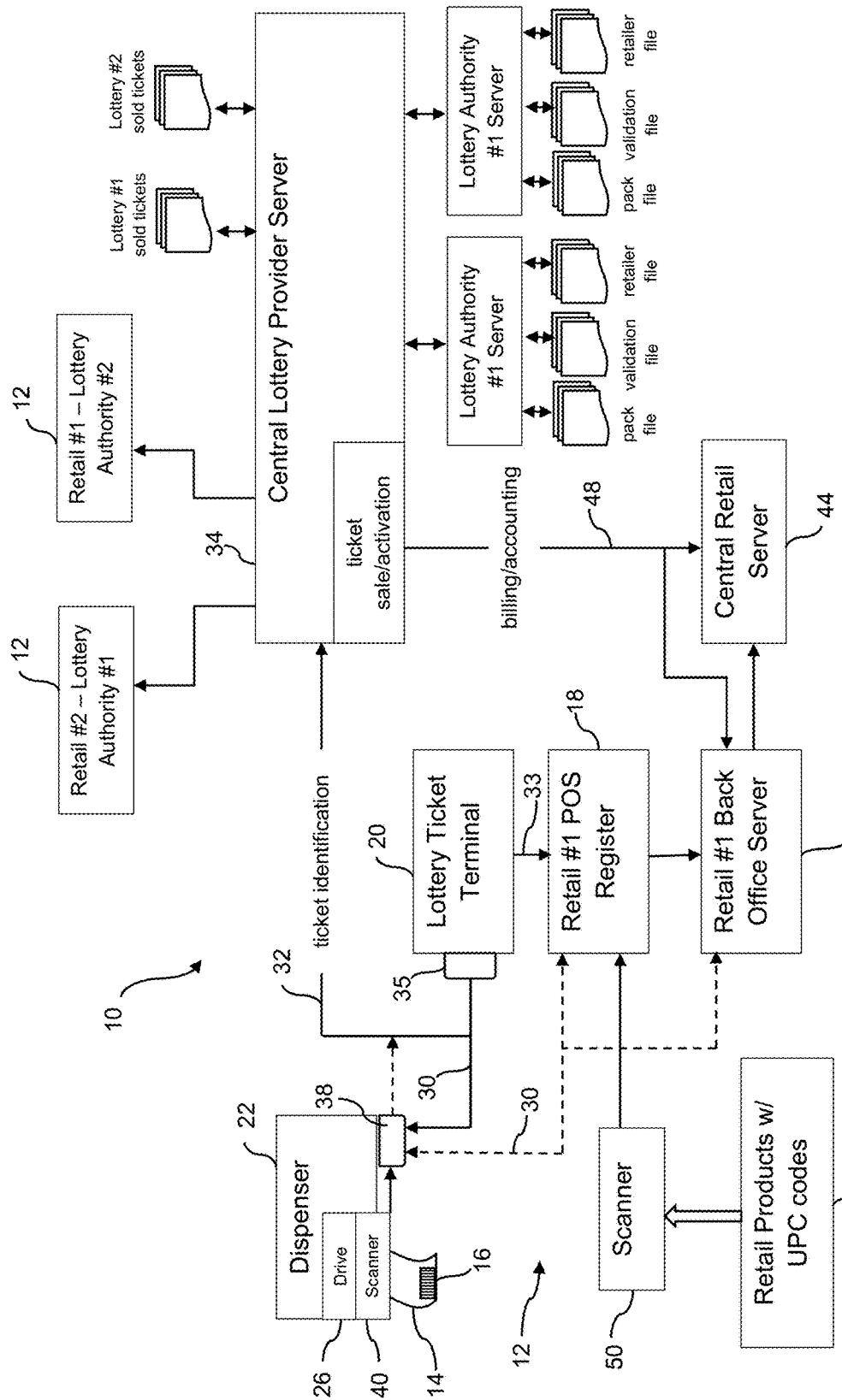
FIG. 1B is a block diagram of an alternate system and associated methodology in accordance with aspects of the present invention.

FIG. 1B depicts a system 10 having many of the components and functionalities discussed above with respect to FIG. 1A. In FIG. 1B, the central lottery server 34 interfaces with more than one Lottery Authority. The Lottery Authorities' servers each typically contain three files related to the distribution, validation and billing for instant lottery games, packs, and tickets. These include the pack file, validation file and retailer file. The pack file is a listing of every pack that can be offered for sale in an instant game along with the activation status of that pack. Typically, such files do not associate an activation status with each individual ticket in a pack, but only a single status based on its unique game-pack number. The validation file is a listing of every winning ticket in a game based on its unique non-locational validation number. Finally, the retailer file contains information on each retail location offering instant tickets for sale in the Lottery Authority's jurisdiction.

The central server 34 is shown to maintain files of sold (dispensed) tickets for each jurisdiction. These files are organized to maintain sold (dispensed) ticket data for each retail location 12 in each jurisdiction. Accordingly, the central server 34 can provide cross-jurisdictional sales reporting to a "Big Box" chain with retail locations in more than one Lottery Authority. Such reporting is very beneficial to such chains and presently cannot be provided in a seamless fashion by individual Lottery Authorities.

Such a system organization permits the implementation of the system 10, in a Lottery Authority whose server was never architected to support recording the sale of individual instant game tickets, with minimal changes to the Lottery Authority server. With the present system 10, all detailed instant ticket sale transaction data is maintained on the central lottery server 34, which may never have been envisioned in the original architecture of extant Lottery Authority servers.

Figure 2:
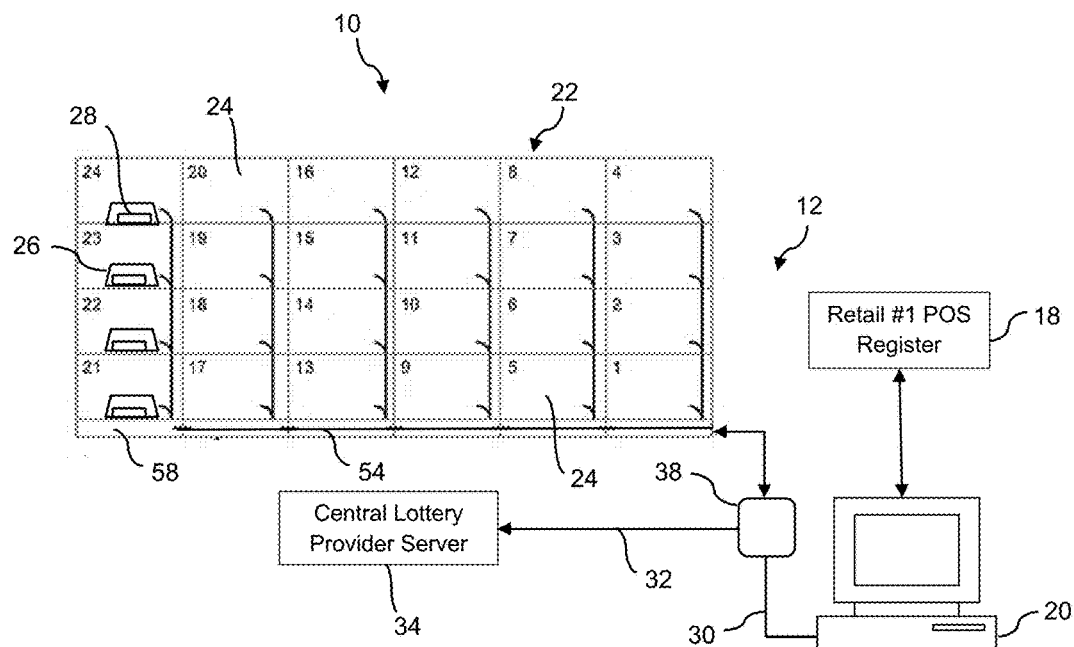
FIG. 2 is a block diagram of a lottery ticket dispenser in accordance with aspects of the present invention.

FIG. 2 depicts a system 10 at a retail establishment 12 wherein the lottery ticket terminal 20 is in communication with the POS register 18 and the bin controller 38, which is in communication with the lottery ticket dispenser array 22. The dispenser array 22 has a plurality of individual bins 24 with different respective lottery tickets contained therein. The lottery tickets each have a machine readable code printed thereon. Each bin 24 in the dispenser array 22 includes an electronic drive mechanism 26 that dispenses the lottery tickets therefrom, and a scanner 28 disposed to read the code on the lottery tickets dispensed from the bin 24. The central lottery server 34 is in direct or indirect (e.g., via the bin controller 38) communication with each bin 24 such that a signal 32 generated by the scanner 28 (and associated reader) at any one of the bins 24 is routed to the central lottery server 34 for each ticket dispensed from the bins 24, the signals 32 identifying the lottery ticket from the scanned code. This system 10 may, in addition, include any of the features and configurations discussed above.

Figure 3:
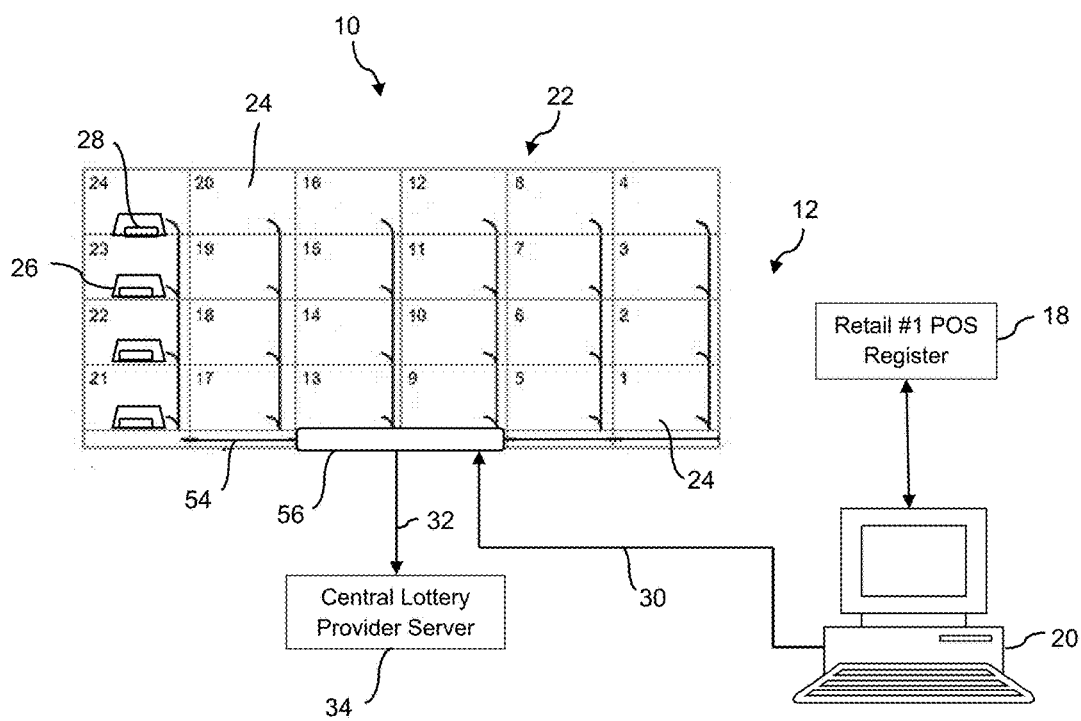
FIG. 3 is a block diagram of another embodiment of a lottery ticket dispenser in accordance with aspects of the present invention.

FIG. 3 depicts an embodiment that is similar to FIG. 2 with the exception that the dispenser array 22 (and thus the individual bins 24) are in direct communication with the central lottery server 34 via a signal router 56 integrated with the dispenser array 22. This router 56 routes the purchase signal 30 from the lottery ticket terminal 20 to the correct bin 24, and routes the bin signal 32 directly to the server 34 via a suitable wired or wireless communication network.

Figure 4:
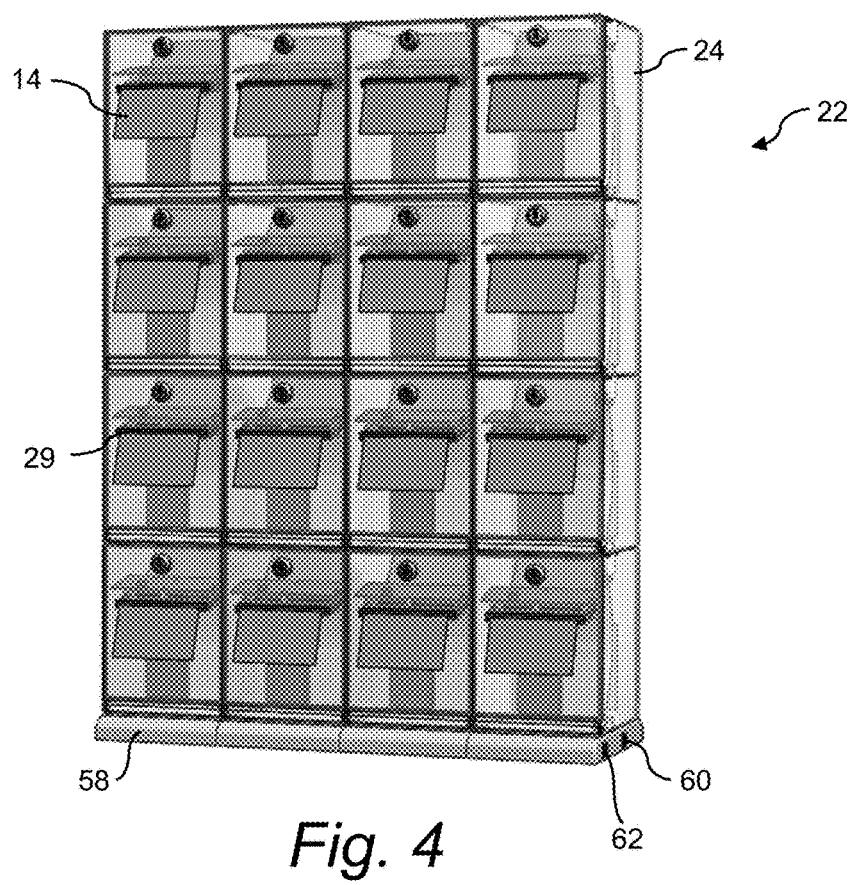
FIG. 4 is a back perspective view of an embodiment of a lottery ticket dispenser.
Figure 5:
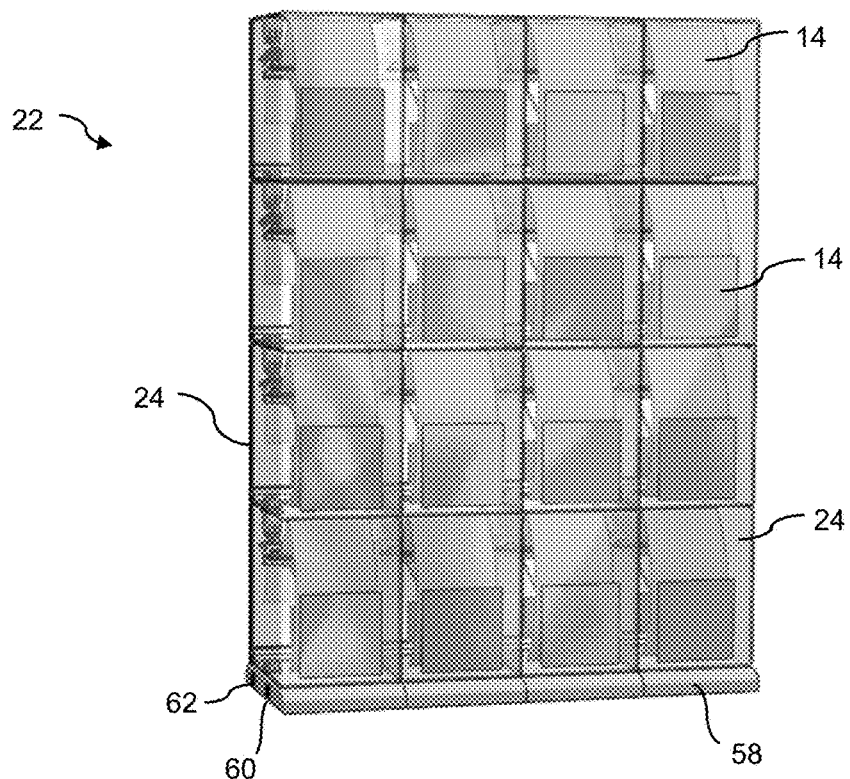
FIG. 5 is a front perspective view of the lottery ticket dispenser of FIG. 4.

FIGS. 4 through 7 depict an embodiment of a dispenser array 22 having a plurality of interconnected individual bins 24. The array 22 includes a bottom row of bins 24 having interconnected base structures 58. For example, each base structure 58 may include a male power plug and male data plug along one side, and a female power port 60 and female data port 62 along the opposite side. The plugs and ports of adjacent base structures 58 interconnect, as depicted in FIGS. 4 and 5, to essentially define a data bus 54 (FIGS. 3 and 4) running the length of the base structures 58. An exposed power port 60 and data port 62 at one of the ends of the interconnected base structures is available for connection with a power cord and a data cord from the controller 38 or lottery terminal 20, as discussed above.

Referring to FIGS. 6 and 7, each of the upper individual bins 24 includes a multi-sided housing in which a pack of lottery tickets 14 is stored. As shown in FIG. 5, each bin 24 may include a sample ticket 14 or other identifying insert attached to a front face of the bin 24 that faces the patrons so that the patron is aware of the exact tickets available for purchase. The tickets 14 may be connected at a perforation line, or separated. A drive mechanism 26 and scanner 40 are configured within each bin 24, as discussed above, wherein upon receipt of a purchase signal, the drive mechanism dispenses the requisite number of tickets 14 out of a slot 29 in the back face of the bin 24 as the scanner 40 reads the code printed on the ticket as it passes through the slot 29. Each bin 24 includes a male power/data connector 64 on the top or bottom surface, and a corresponding female power/data connector 66 on the opposite surface. With this configuration, a plurality of the bins 24 can be vertically stacked and interconnected as depicted in FIGS. 4 and 5.

The present invention also encompasses various method embodiments for dispensing lottery tickets 14 at a retail establishment 12 in accordance with aspects discussed above. One such method includes inputting a request for a particular lottery ticket 14 from a plurality of different available tickets into a lottery terminal 20 that is in communication with a point-of-sale (POS) register 18 at the retail establishment 12. A signal is then transmitted to a lottery ticket dispenser 22 to dispense the requested lottery ticket from one of a plurality of separate bins 24 configured in the dispenser. The requested ticket(s) is then dispensed from the appropriate bin and a code 16 printed on the lottery ticket is scanned as it is dispensed from the bin. A signal 32 routed from the bin scanner 40 is then transmitted to a central lottery server 34, the signal identifying the lottery ticket from the scanned code such that each lottery ticket dispensed from one of the bins is individually and immediately, or periodically, identified to the central lottery server.

The method may include transmitting a purchase code 33 for the lottery ticket from the lottery terminal 20 to the retail POS register 18 for payment of the lottery ticket at the POS register, or transmitting the code 33 from the POS device to the lottery terminal once payment has been received at the POS terminal.

With the method, the signal 30 transmitted to the lottery ticket dispenser 22 may be generated from the retail POS register 18 or the lottery ticket terminal 20.

The method may further include marking the dispensed lottery ticket 14, at the central lottery server 34, as sold and changing its activation status from inactive to active, upon receipt of the signal 32 identifying the lottery ticket 14 as having been dispensed. Accountability and billing information may be provided to a central retail server 44 from the central lottery server 34 based on lottery tickets dispensed during defined time periods. Accountability and billing information may also be transmitted from the central lottery server 34 to a retail back officer server 46 of the respective retail establishments 12 based on lottery tickets dispensed during defined time periods. A plurality of retail locations 12 may be in communication with the central retail server 44 and the central lottery server 34, wherein the method further includes providing accountability and billing information to the central retail server 44 from the lottery server 34 for each of the retail establishments 12 based on lottery tickets 14 dispensed at the respective retail locations during defined time periods.

The material particularly shown and described above is not meant to be limiting, but instead serves to show and teach various exemplary implementations of the present subject matter. As set forth in the attached claims, the scope of the present invention includes both combinations and sub-combinations of various features discussed herein, along with such variations and modifications as would occur to a person of skill in the art.

What is claimed is:

1. A system for dispensing lottery tickets at a plurality of retail establishments, comprising:
 a plurality of retail establishments, each of the retail establishments further comprising:
  a retail point-of-sale (POS) register;
  a lottery ticket terminal in communication with the retail POS register and configured to accept a request for purchase of a particular lottery ticket selected from a plurality of different lottery tickets;
  a lottery ticket dispenser array in communication with the lottery ticket terminal, the dispenser array comprising a plurality of separate bins having a different respective lottery ticket stored therein, the lottery tickets containing a machine readable code printed thereon;
  each bin having an electronic drive mechanism that dispenses the lottery tickets therefrom;
  each bin comprising a scanner that reads the code on lottery tickets dispensed from the bin;
  the lottery ticket terminal transmitting a purchase signal for dispensing a particular lottery ticket that is routed to the respective bin containing the particular lottery ticket;
 a central lottery server in communication with the lottery ticket dispenser array of each of the retail establishments, each bin transmitting a signal that is routed to the central lottery server for each lottery ticket dispensed from the respective bin, the signal identifying the lottery ticket from the code read by the scanner;
 the central lottery server operating to activate individual lottery tickets dispensed from the bins upon receipt of the signal identifying the lottery ticket dispensed from the bin;
 the central lottery server operating to generate accountability and billing reports based on the individual lottery tickets activated by the central lottery server for each of the plurality of retail establishments during defined time periods; and
 a central retail server in communication with the central lottery server and each of the plurality of retail establishments such that the accountability and billing reports for the retail establishments are collectively transmitted from the central lottery server to the central retail server and individually transmitted from the central lottery server to the retail establishments.

2. The system as in claim 1, wherein the lottery ticket terminal is configured to directly transmit a purchase code for the lottery ticket to the retail POS register, wherein a patron pays for the lottery ticket at the POS register along with other goods purchased at the retail establishment in a single transaction.

3. The system as in claim 1, further comprising a bin controller that routes the purchase signals from the lottery ticket terminal to the respective bin containing the particular lottery ticket.

4. The system as in claim 1, further comprising a retail back office server at each of the plurality of retail establishments in communication with the retail POS register, the central lottery server providing accountability information to the back office server based on lottery tickets dispensed during defined time periods.

5. The system as in claim 1, wherein the lottery ticket terminal directly transmits the purchase signal to the bin for dispensing the lottery ticket.

6. The system as in claim 1, wherein the retail POS register is in communication with the bin and transmits the purchase signal to the bin for dispensing the lottery ticket.

7. A method for dispensing lottery tickets at a plurality of retail establishments, comprising:
   at each of the plurality of retail establishments, inputting a request for a particular lottery ticket from a plurality of different tickets into a lottery terminal at the retail establishment;
   transmitting a signal to a lottery ticket dispenser array to dispense the requested lottery ticket from one of a plurality of separate bins configured in the dispenser;
   dispensing the particular lottery ticket from one of the bins and scanning a code on the lottery ticket as it is being dispensed with a scanner configured with the bin;
   transmitting a signal to a central lottery server routed from the bin that identifies the lottery ticket from the scanned code such that each lottery ticket dispensed from the bins is individually identified to the central lottery server;
   at the central lottery server, activating the individual lottery tickets dispensed from the bins upon receipt of the signal identifying the lottery ticket dispensed from the bin; and
   from the central lottery server, generating accountability and billing reports based on the individual lottery tickets activated by the central lottery server during defined time periods and transmitting the accountability and billing reports individually to the retail establishments and collectively to a central retail server at scheduled times, the central retail server in communication with the central lottery server and the lottery ticket dispenser array at each of the plurality of retail establishments.

8. The method as in claim 7, further comprising directly transmitting a purchase code for the lottery ticket from the lottery terminal to a retail POS register for payment of the lottery ticket at the POS register, wherein a patron pays for the lottery ticket at the POS register along with other goods purchased at the retail establishment in a single transaction.

9. The method as in claim 8, wherein the signal to the lottery ticket dispenser is generated from the lottery ticket terminal.

10. The method as in claim 7, wherein a retail back office server is in communication with the retail POS register at each of the plurality of retail establishments, the method further comprising providing accountability information from the central lottery server to the retail back office server based on lottery tickets dispensed during defined time periods.

11. The system as in claim 1, wherein the retail POS register is configured to directly transmit a purchase code for the lottery ticket to the lottery ticket terminal once a patron pays for the lottery ticket at the retail POS register.

12. The method as in claim 7, further comprising directly transmitting a purchase code for the lottery ticket from a retail POS register to the lottery terminal once a patron pays for the lottery ticket at the retail POS register.

* * * * *